United States Patent [19]
Iijima

[11] Patent Number: 5,961,171
[45] Date of Patent: Oct. 5, 1999

[54] PARTITION DEVICE IN VEHICULAR TRUNK

[76] Inventor: Shunichi Iijima, 2494-2, Hono, Tsuru-shi, Yamanashi, Japan

[21] Appl. No.: 08/874,862

[22] Filed: Jun. 13, 1997

[30]  Foreign Application Priority Data

Aug. 2, 1996  [JP]  Japan .................................. 8-204967
Sep. 26, 1996 [JP]  Japan .................................. 8-255011

[51] Int. Cl.⁶ .................................................. B60R 5/00
[52] U.S. Cl. ...................... 296/37.1; 220/531; 220/534; 220/551; 224/42.34; 410/135
[58] Field of Search ................................ 296/37.1, 37.6, 296/37.9; 220/529, 534, 549, 550, 531, 551; 224/925, 42.34, 42.33, 551, 549, 555; 410/129, 130, 121, 135, 120

[56]  References Cited

U.S. PATENT DOCUMENTS

| | | | |
|---|---|---|---|
| 2,514,466 | 7/1950 | Bildhauer | 410/129 |
| 4,396,325 | 8/1983 | Joice-Cavanagh | 410/129 |
| 5,161,700 | 11/1992 | Stannis et al. | 224/925 X |
| 5,520,316 | 5/1996 | Chen | 224/925 X |
| 5,626,380 | 5/1997 | Elson et al. | 296/37.1 X |

FOREIGN PATENT DOCUMENTS

| | | | |
|---|---|---|---|
| 535426-A1 | 4/1993 | European Pat. Off. | 296/925 |
| 2247651 | 3/1992 | United Kingdom | 296/37.1 |

*Primary Examiner*—D. Glenn Dayoan
*Assistant Examiner*—Jason Morrow
*Attorney, Agent, or Firm*—Wenderoth, Lind & Ponack, L.L.P.

[57]  ABSTRACT

The present invention aims at holding articles within a vehicular trunk firmly without sliding movement during vehicular running by means of a partition member provided in the trunk. According to the vehicular trunk partitioning device of the invention, the partition member is attached on one side thereof to the floor or a side wall of a vehicular trunk so as to be pivotable around the one side. The partition member is urged pivotally toward the floor or the side wall of the trunk around the one side. Preferably, the partition member can extend and retract in a telescopic fashion.

5 Claims, 16 Drawing Sheets

PARTITION DEVICE IN VEHICULAR TRUNK

BACKGROUND OF THE INVENTION

1. Field of the Invention

The present invention relates to a partition device in a vehicular trunk to be used for classifying and accommodating articles in the trunk or classifying and accommodating articles in the trunk while pressing and supporting the articles. Particularly, the invention is concerned with a partition device in a vehicular trunk to be used for classifying and accommodating articles in an automobile trunk or classifying and accommodating articles in the trunk while pressing and supporting the articles in such a manner that the articles do not move (slide) during running of the automobile.

2. Description of the Related Art

Heretofore, since there is no partition in the trunks of, for example, passenger cars, wagons and vans, the place for accommodating articles has been ensured by giving some consideration to the position where the articles are to be accommodated, or articles have been contained in a corrugated cardboard box or the like prior to being carried into a vehicular trunk.

However, in the case of articles of a small volume, it is required to put unnecessary things into the trunk together with the articles to prevent movement of the articles or is required to use an auxiliary thing such as a corrugated cardboard. Thus, there have been problems to be solved.

If such consideration is not given to the case where the quantity of articles is relatively small, the articles will slide on the floor of the trunk at every start-up or stop of the vehicle or at every tilting of the vehicle.

SUMMARY OF THE INVENTION

The present invention has solved all of the above conventional problems by attaching one side of a partition member to the floor or a side wall of a trunk pivotably around the said one side and by using means for urging the partition member back to the trunk floor or side wall pivotably around the said one side.

According to the present invention there is provided a partition device in a vehicular trunk wherein one side of a partition member is mounted to the floor or a side wall of the vehicular trunk to partition the interior of the trunk. More specifically, the partition device is constituted as follows.

In the partition device of the present invention, one side of a partition member is secured to the floor or a side wall of a vehicular trunk pivotably around the said one side, and means for urging the partition member pivotally back to the trunk floor or side wall around the said one side is provided. By connecting one side of the partition member to the vehicular trunk floor or side wall pivotably around the one side, the partition member when not in use can be held at a position parallel to the trunk floor or side wall. When an article is to be accommodated in the trunk, the partition member is pivotally moved to hold the article between the trunk floor or side wall and the partition member. In this case, since the partition member is urged for pivotal return toward the trunk floor or side wall, the article can be held firmly between the trunk floor or side wall and the partition member, with no fear of movement (sliding) of the article during vehicular running or at every start-up or stop of the vehicle.

Preferably, the partition member is constituted in such a manner that it can extend and retract so as to be stowed compactly when not in use. If the portion where the partition member is mounted to the trunk floor or side wall is made movable laterally along the trunk floor or side wall, it becomes possible to adjust the spacing between adjacent partition members. This is convenient for accommodating articles of different sizes.

If a locking portion for locking the partition member to the trunk floor or side wall is provided on the side opposite to the side where the partition member is mounted to the trunk floor or side wall, it becomes possible to let the partition member stand upright on the floor or make the partition member stronger.

Moreover, an automated partition device is proposed in the present invention. More specifically, in the invention, there is provided a vehicular trunk partitioning device in which one side of a partition member is secured to the floor or a side wall of a vehicular trunk pivotably around the said one side and which is provided with power means for pivotably reciprocating the partition member between the position of the partition member not in use and the position thereof in use. The power means comprise a worm interlocked with a motor shaft and a worm gear meshing with the worm and fixed onto a partition member mounting shaft.

Further, according to the present invention, there is provided a vehicular trunk partitioning device in which the lower portion of a partition case is mounted to the floor of the vehicular trunk so that it can rise and fall pivotably around the said lower portion, means for holding the partition case upright is attached to the lower portion of one side wall of the partition case, and a partitioner capable of extension and retraction is received in the partition case. The lower end side of the partitioner is fixed to the inside bottom of the partition case, while on the upper end side thereof is provided a locking portion for locking the partitioner to the ceiling of the trunk.

Lastly, according to the present invention, there is provided a vehicular trunk partitioning device in which openings formed in the lower ends of pillars located on both sides of a partition member capable of extension and retraction are fitted and locked onto the floor at positions close to both side walls of the vehicular trunk. This partition device may also be constituted such that rails are laid in parallel on the floor at positions close to both side walls of the vehicular trunk, fitting means are secured slidably to the rails, and the openings in the lower ends of the pillars located on both sides of the partition member capable of extension and retraction are fitted and locked onto the fitting means.

As to the above partition member, no special limitation is placed on its concrete structure. For example, it is a plate, a frame obtained by assembling frame portions in a square shape, a frame obtained by assembling fine tubes, or a reticulate plate. Thus, there may be used a known partition member such as, for example, a rack or a fence.

Although there is no special limitation imposed on the structure for mounting the partition member to the trunk floor or side wall, it is preferable that the partition member be pivotable around the position where the partition member is secured to the trunk floor or side wall and that the partition member when pivotally moved be urged back to the trunk floor or side wall.

Preferably, the partition member is capable of extension and retraction and is composed of rods or pipes which are successively fitted together in a telescopic fashion, or is composed of bellows or a plate capable of extension and retraction. Neither the material nor the sectional shape of the partition member is limited. For example, the partition member may be formed of a metal, a synthetic resin, or FRP (fiber glass reinforced plastic).

For urging the partition member, a coiled spring is used. A plate spring may be also employable of course.

Thus in the present invention, since one side of the partition member is secured pivotably to the trunk floor or side wall, it is possible to partition the interior of trunk whenever required and as desired. If the partition member is urged for pivotal return to the trunk floor or side wall, articles can be held under pressure between the partition member and the trunk floor or side wall. Therefore, articles can be held stably during vehicular running or at every start-up or stop of the vehicle irrespective of the quantity of articles.

According to the present invention, moreover, the interior of a vehicular trunk can be partitioned by raising a partition case from its falled state on the trunk floor and then drawing out a partitioner stowed within the partition case. Thus, the present invention is applicable also to a vehicle not having a wall surface for the mounting of a partitioner.

In the case where rails are laid in parallel with side walls of a vehicular trunk so that a partition member can move freely on the rails laterally, it is possible to change the width between adjacent partition members as desired, and hence articles can be held stably irrespective of the size of articles.

Further, since the partition member can be removably fitted on fitting means fixed to the floor or the like of a vehicular trunk, when the partition member is not in use, it can be removed from the fitting means and be stowed in a simple manner.

DETAILED DESCRIPTION OF THE PREFERRED EMBODIMENTS

Embodiment 1

A partition device according to the first embodiment of the present invention will be described below with reference to FIGS. 1, 2, 3, 4, 5 and 6.

Figure 1:
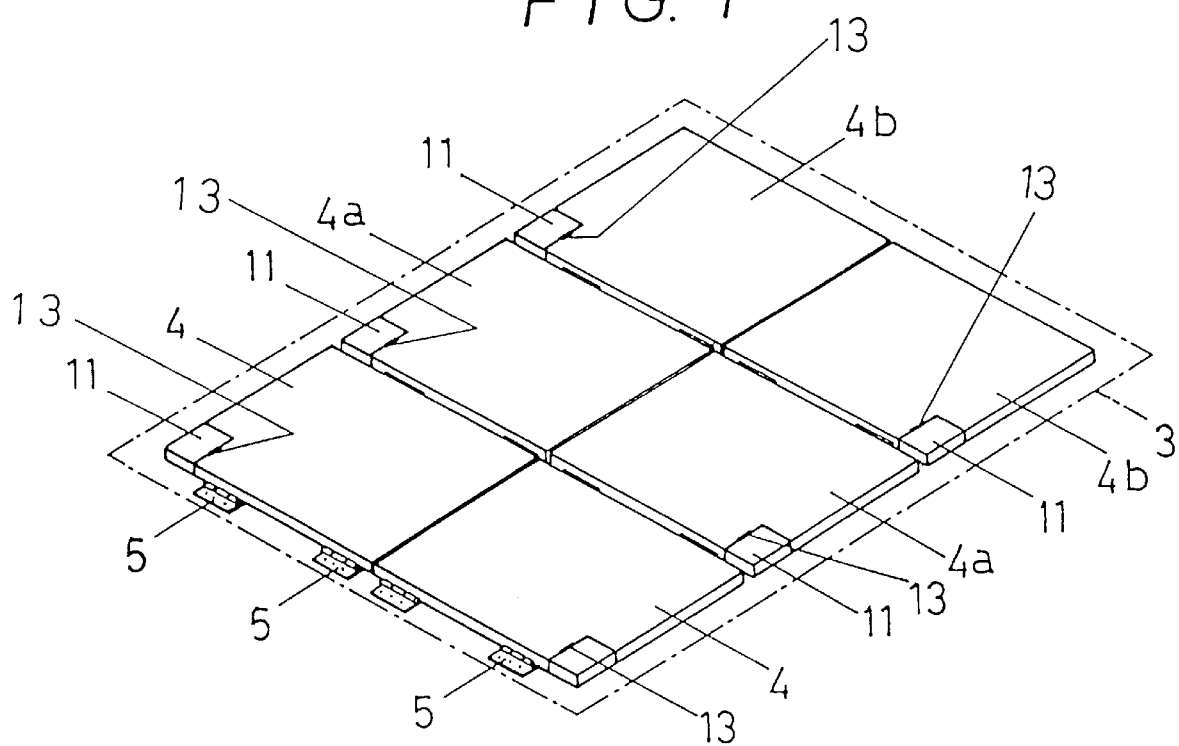
FIG. 1 is a perspective view of a partition device according to the first embodiment of the present invention.
Figure 4:
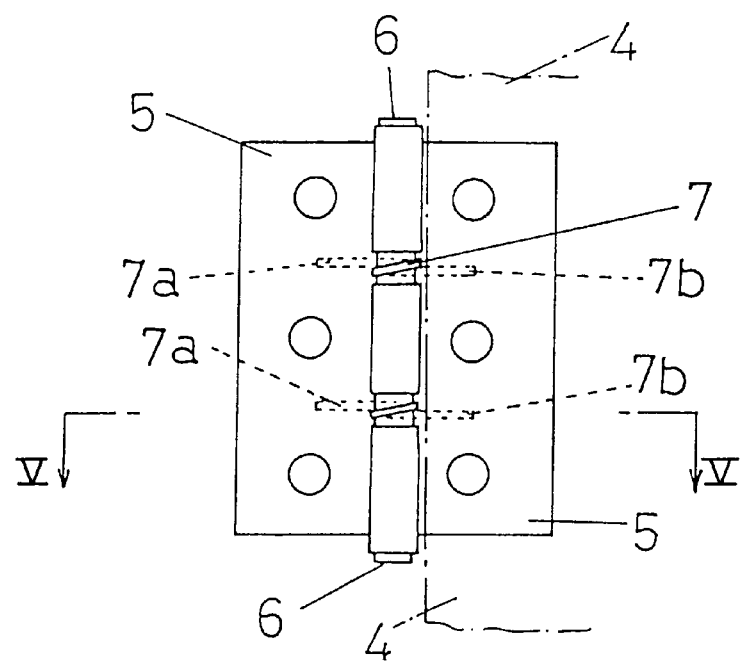
FIG. 4 is an enlarged plan view of a hinge portion of the partition device shown in FIG. 1.
Figure 5:
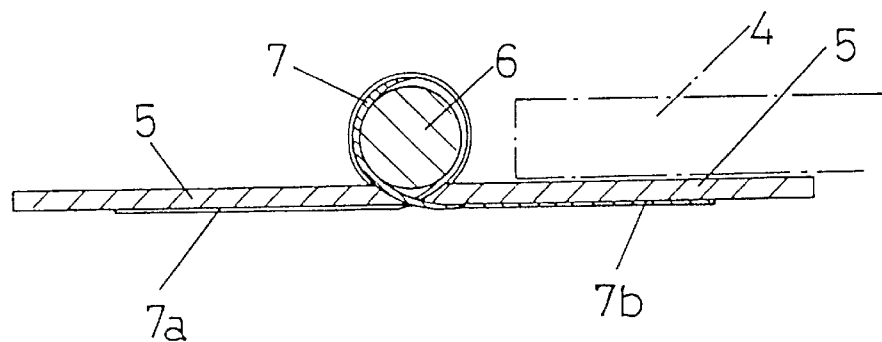
FIG. 5 is a sectional view taken on line A—A in FIG. 4.
Figure 6:
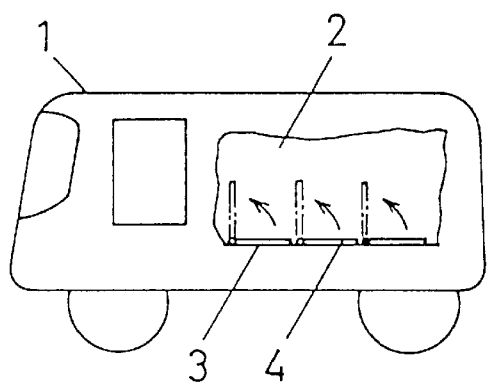
FIG. 6 is a partially cut-away side view of an automobile using the partition device of FIG. 1.

As shown in FIG. 1, partition plates 4, 4a and 4b are arranged and fixed at predetermined spacings through hinges 5 on a floor 3 of a trunk 2 of such an automobile 1 as illustrated in FIG. 6. As shown in FIGS. 4 and 5, a coiled spring 7 is fitted on a shaft 6 of each hinge 5, and one end 7a of the coiled spring 7 is fixed to the hinge 5 which is fixed to the floor 3, while the other end 7b thereof is fixed to the partition plate 4 (or the hinge fixed to the partition plate 4 side). In this way the partition plates 4, 4a and 4b are urged toward the floor 3.

Figure 2:
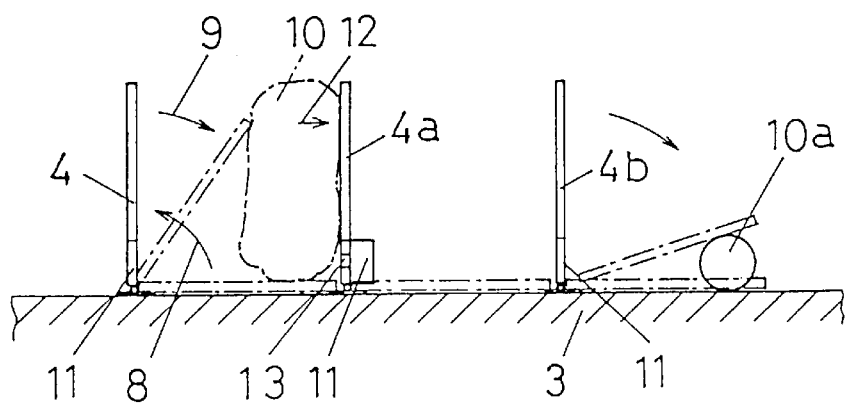
FIG. 2 is a side view showing in what state the partition device of FIG. 1 is used.
Figure 3:
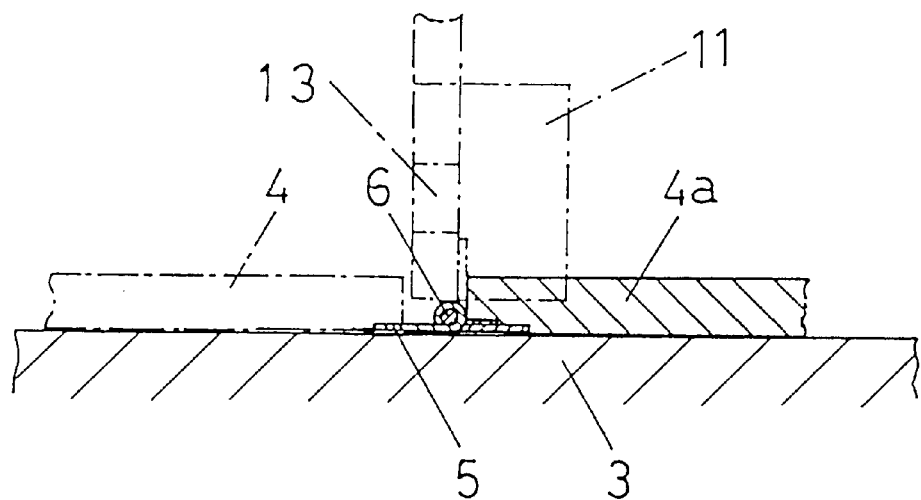
FIG. 3 is a partially enlarged view of FIG. 2.

In this embodiment, when the partition plate 4 is raised as indicated with arrow 8 in FIG. 2 and is then released, the partition plate 4 is urged in the direction of arrow 9 under the action of the coiled spring 7, whereby an article 10 can be held inside the partition plate 4 as indicated with chain line in FIG. 2. In this case, if a support piece 11 mounted on the lower side of the partition plate 4a located on the right-hand side is turned at right angles beforehand, the partition plate 4a is raised nearly vertically and so there is no fear of the partition plate 4a falling down even if the article 10 leans on the partition plate 4a as indicated with arrow 12. In the case of a relatively small article 10a, the article 10a is held between the partition plate 4b and the floor 3 under the action of the coiled spring 7, as illustrated on the right-hand side in FIG. 2.

The support piece 11 is hinged to the partition plate 4 so as to be pivotable between the state in which the support piece 11 is flush with the partition plate 4 (FIG. 1 and the left- and right-hand state in FIG. 2) and the state in which the support piece 11 is perpendicular to the partition plate 4 (the central state in FIG. 2). By virtue of a permanent magnet, which is indicated by the reference numeral 13 in FIG. 1 and the central state in FIG. 2, the support piece 11 is kept flush with the partition plate 4.

Embodiment 2

The second embodiment of the present invention will be described below with reference to FIGS. 7, 8 and 9.

Support plates 15, 15a and 15b are fixed vertically to a side wall 14 of a vehicular trunk, and fitting balls 16, 16a and 16b are projected from each of the support plates 15, 15a and 15b laterally at predetermined spacings. Further, cap portions 23, 23a and 23b fixed respectively to the base ends of partitioning frame rods 17, 17a and 17b are fitted rotatably and pivotably on the fitting balls 16, 16a and 16b, respectively, (FIGS. 7 and 8). Frame rods 18, 18a, 18b and 19, 19a, 19b are fitted on the front ends of the frame rods 17, 17a and 17b successively in a telescopic fashion. The frame rods 19, 19a and 19b are connected together at their front ends through a connecting rod 20 (20a, 20b). From the underside of the connecting rod 20 (20a, 20b) is projected a locking lug 21 vertically movably (FIGS. 7 and 8).

The locking lug 21 is fitted in and fixed to a locking tube 22 which is fixed to the floor 3. In FIG. 8, the reference numeral 36 denotes a lock pin for a stem 37 of the locking lug 21.

Figure 8:
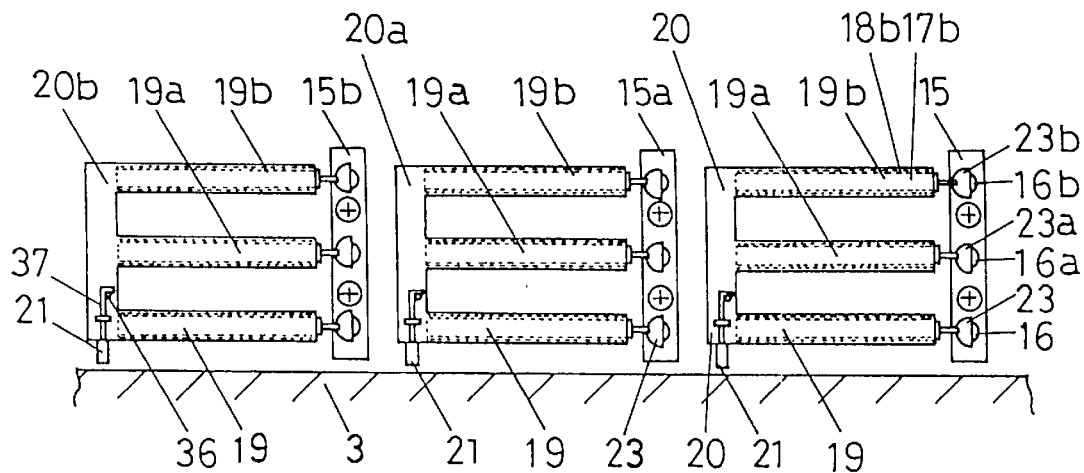
FIG. 8 is a side view of the partition device shown in FIG. 7 which device is not in use.

When the partition device of this embodiment is not in use, it is fixed to the side wall of the trunk in such a state as shown in FIG. 8. For example, the partition device is fixed to the side wall 14 by attraction of permanent magnets 24 and 25, as indicated with chain line in FIG. 9. Thus, the partition device when not in use can be stowed in a contracted state.

Figure 9:
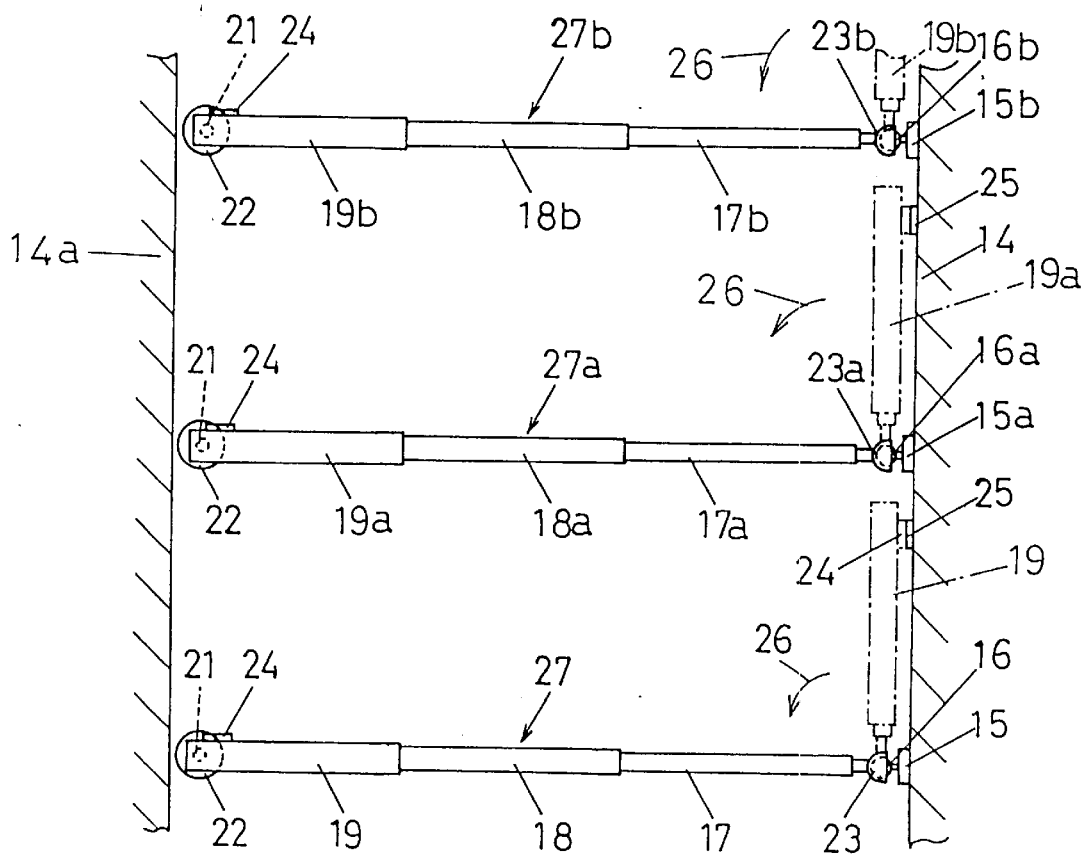
FIG. 9 is a plan view of the partition device shown in FIG. 7 which device is in use.

When articles are to be accommodated in the vehicular trunk, the frame rods are turned 90° as indicated with arrows 26 in FIG. 9, then the frame rods 18 and 19 are extended and the locking lug 21 of the connecting rod 20 is fitted in and fixed to the locking tube 22 in the floor 3. In this way there are formed strong partition frames 27, 27a and 27b (FIG. 9). In FIG. 9, the reference numeral 14a denotes the other side wall of the trunk.

Although in this embodiment there are adopted three sets of support plates 15, 15a, 15b and frame rods 17, 17a, 17b, there may be adopted one or two sets of support plates and frame rods according to the size of a vehicular trunk.

Embodiment 3

Figure 7:
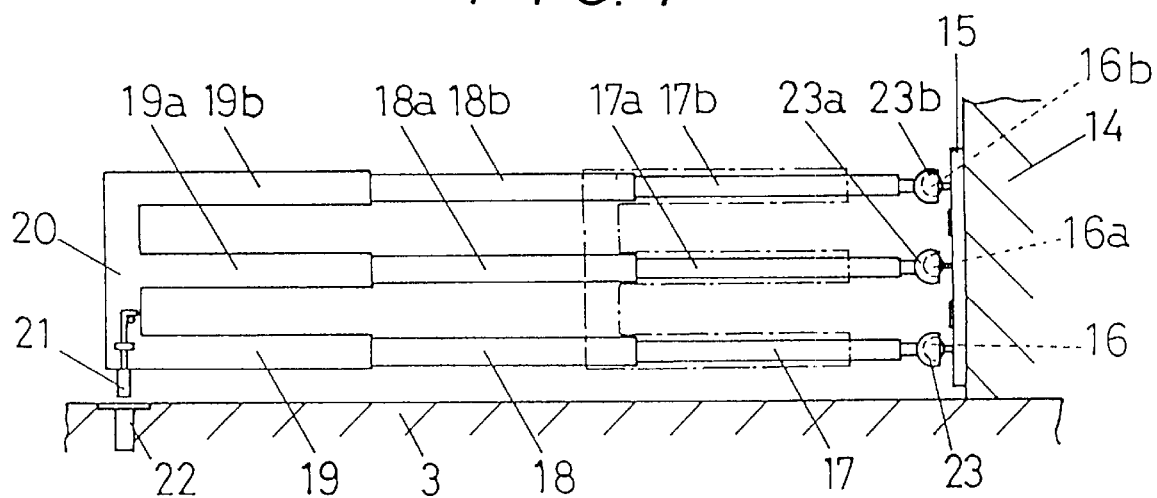
FIG. 7 is a front view showing in what state a partition device according to the second embodiment of the present invention is used.
Figure 10:
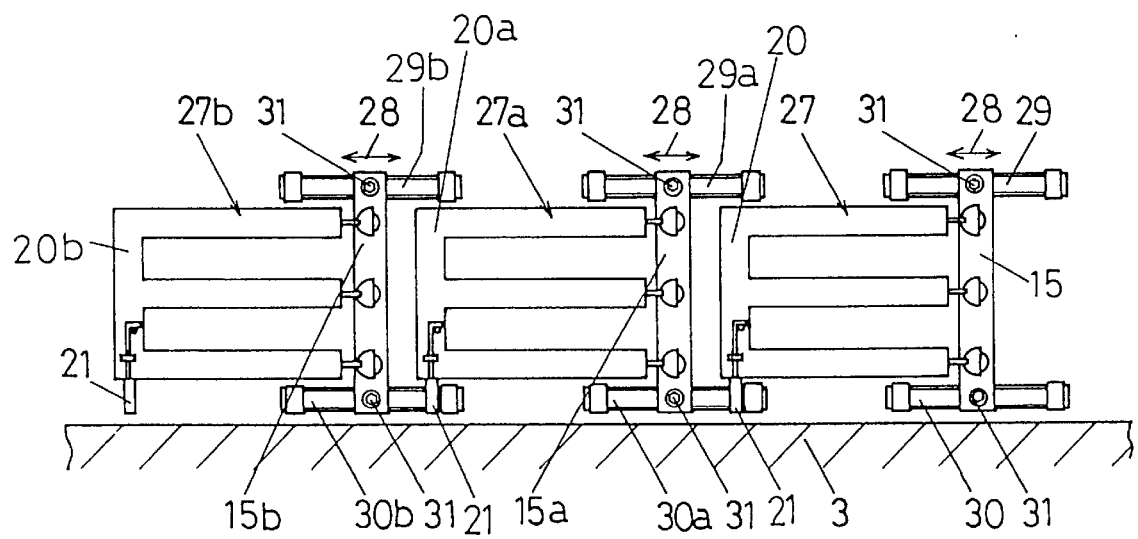
FIG. 10 is a side view of a partition device according to the third embodiment of the present invention which device is not in use.
Figure 11:
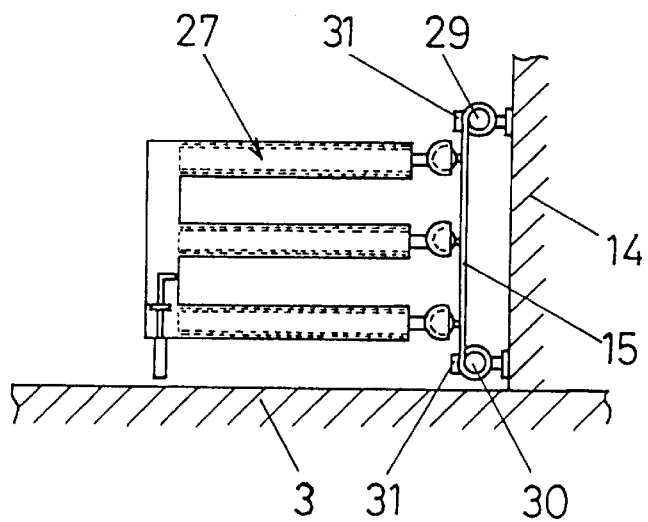
FIG. 11 is a front view showing the partition device of FIG. 10 with frame rods in a retracted state.

In the embodiment illustrated in FIGS. 10 and 11, the support plates 15, 15a and 15b shown in FIGS. 7, 8 and 9 are made movable right and left as indicated with arrow 28 (FIG. 10) so that the spacing between adjacent partition plates (27, 27a, 27b) can be adjusted.

To be more specific, upper guide rods 29, 29a, 29b and lower guide rods 30, 30a, 30b are fixed to the side wall 14 at a predetermined vertical spacing, and the upper and lower ends of the support plates 15, 15a, 15b are fitted in the guide rods 29 and 30 in such a manner that they are slidable and can be fixed to with lock bolts 31, 31.

In this embodiment, unlike the previous embodiment 2, it is required that the locking tubes 22 disposed in the floor 3 for fitting and fixing therein of locking lugs 21 projected vertically from the undersides of the connecting rods 20, 20a, 20b be formed in the shape of a channel corresponding to the lateral length of the guide rods 29, 29a, 29b.

Lateral movement of the partition frames 27, 27a and 27b is prevented by fixing the support plates 15, 15a and 15b to the guide rods 29, 29a, 29b, 30, 30a and 30b with lock bolts 3 1. Once the locking lugs 21 are fitted and locked in the channel-like locking tubes 22, the partition frames 27, 27a and 27b are prevented from turning around the fitting balls 16, 16a, 16b and the cap portions 23, 23a, 23b.

Regarding how to use the partition frames 27, 27a, 27b in this embodiment and how to stow them when not in use, explanation is here omitted because they are the same as in the second embodiment.

Embodiment 4

Figure 12:
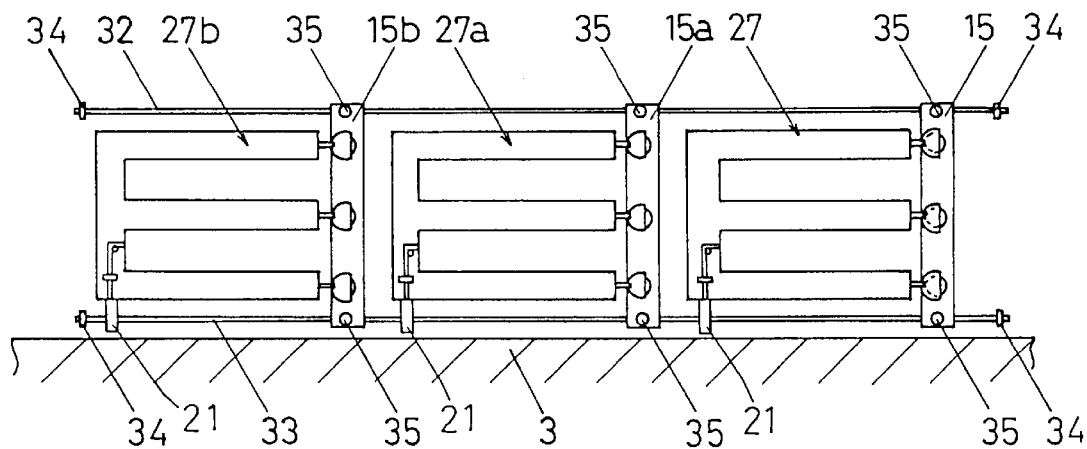
FIG. 12 is a side view showing the partition device of an application example of the third embodiment which is not in use.

The embodiment illustrated in FIG. 12 is an application example of the above third embodiment. In this application example, common guide rods 32 and 33 are fixed to a side wall of a vehicular trunk at a predetermined vertical spacing, and the upper and lower ends of support plates 15, 15a and 15b are slidably fitted in the guide rods 32 and 33. In the same figure, each of the numeral 34 denotes a fixing piece for the guide rods 32 and 33, and numeral 35 denotes a fixing piece for fixing the support plate 15 (15a, 15b) to the guide rod 32 (33).

In this embodiment, the sliding movement of each of the support plates 15, 15a and 15b can be adjusted throughout the overall length of the guide rods 32 and 33. To this end, locking tubes 22 disposed in the floor 3 for fitting and fixing therein of locking lugs 21 projected vertically movably from the undersides of the connecting rods 20, 20a and 20b are formed in the shape of a channel corresponding to the lateral length of the guide rods 32 and 33. Even in such a construction, the partition frame 27 (27a, 27b) is prevented from lateral movement and turning around the fitting balls 16 and cap portion 23. This is the same as in the previous embodiments.

Embodiment 5

An embodiment of an automated construction according to the present invention will be described below with reference to FIGS. 13, 14, 15, 16 and 17.

Figure 13:
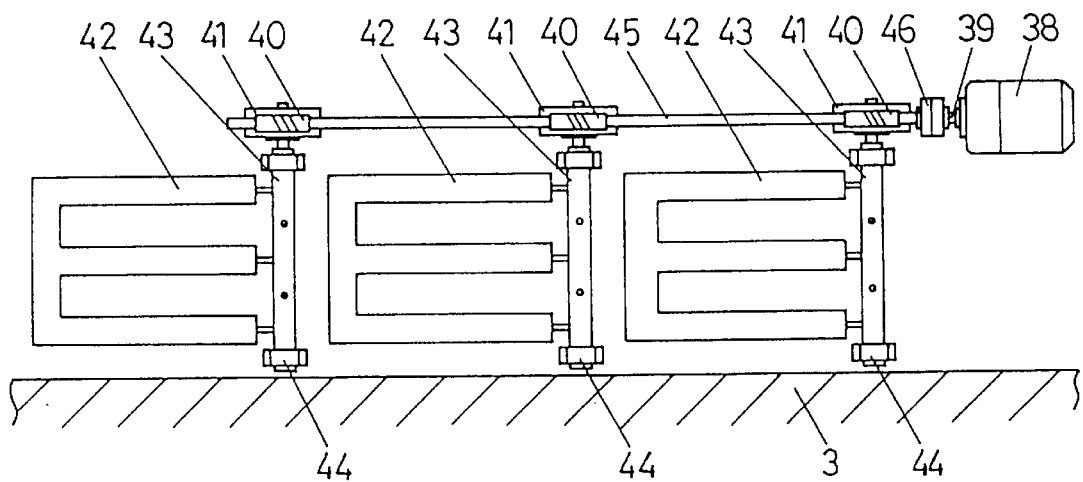
FIG. 13 is a side view of a partition device according to the fourth embodiment of the present invention which device is not in use.
Figure 14:
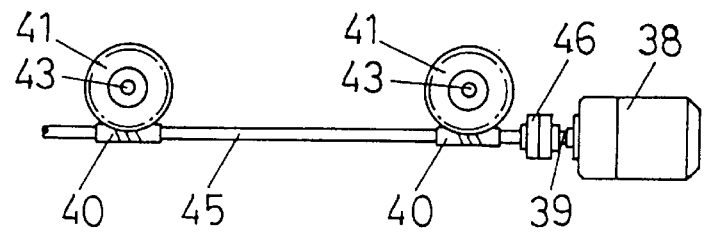
FIG. 14 is a partial plan view of the partition device shown in FIG. 13.

In this embodiment, a reduction motor 38 is used as a prime mover, and power for rise and fall of partition frames is transmitted to the partition frames through a shaft 39 of the motor, worms 40 and worm gears 41. In FIGS. 13 and 14, shafts 43 of the partition frames 42 are connected rotatably to bearings 44 which are fixed to a trunk side wall. The worm gears 41 are fixed onto the upper ends of the shafts 43, the worms 40 are brought into mesh with the worm gears 41, and a shaft 45 of the worms 40 is connected to the shaft 39 of the motor 38 through a coupling 46.

When the driver turns ON a switch (not shown) to start the motor 38, the rotation of the motor shaft 39 is transmitted to the shafts 43 through the coupling 46, shaft 45, worms 40 and worm gears 41, whereby the partition frames 42 can be turned up to a desired rotational angle. The rotation of the shaft 43 can be controlled by turning ON and OFF of the motor 38. If the motor is rotated reverse by switch-over of a motor circuit, the partition frames 42 can be returned to their initial positions.

Figure 15:
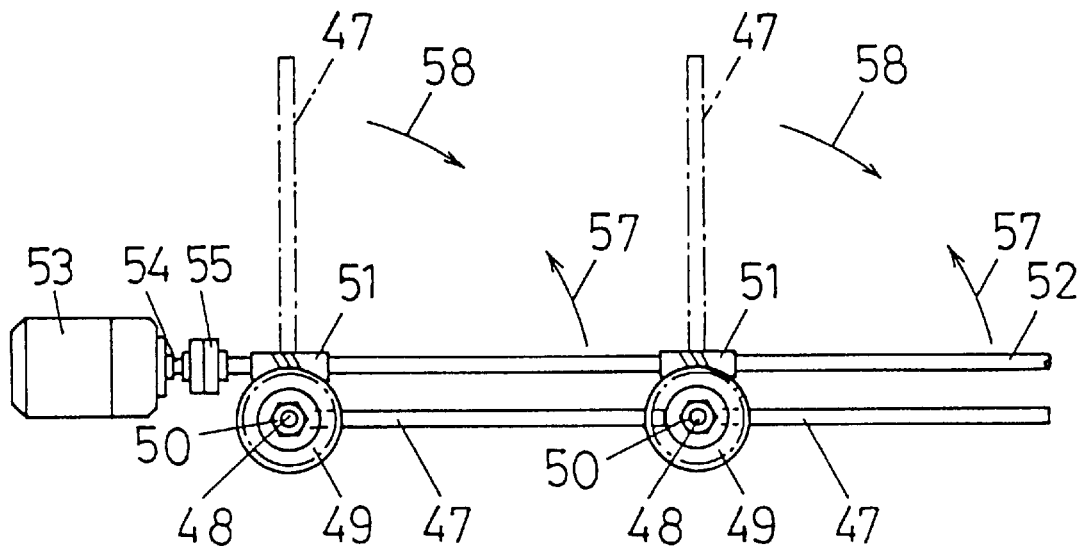
FIG. 15 is a partial side view of a partition device in a modification of the fifth embodiment.
Figure 16:
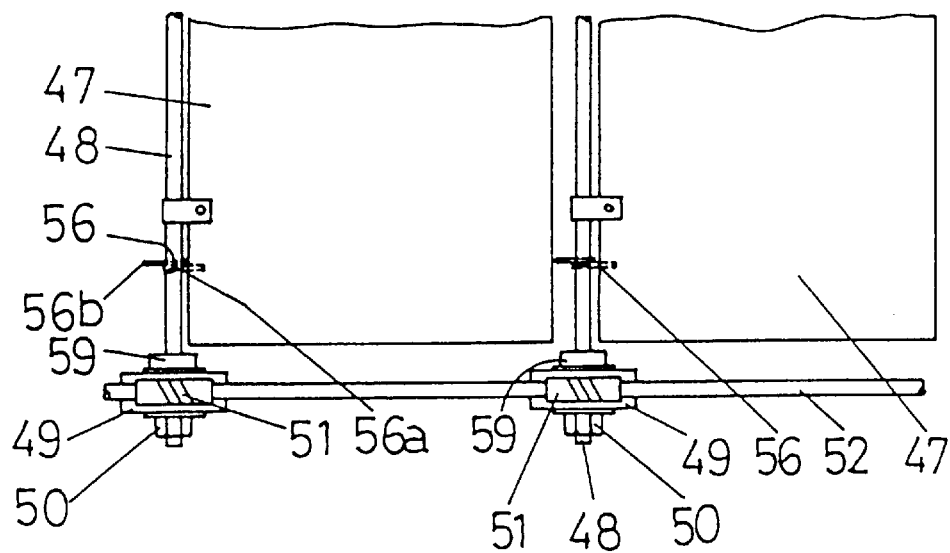
FIG. 16 is a partial plan view of the partition device shown in FIG. 15.
Figure 17:
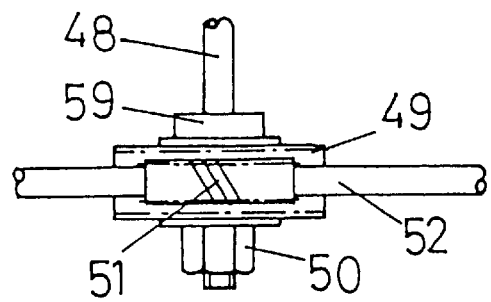
FIG. 17 is a partially enlarged plan view showing a relation between worm and worm gear in the partition device of FIG. 15.

In the embodiment illustrated in FIGS. 15, 16 and 17, one end of each partition plate 47 is fixed to a pivot shaft 48, a worm gear 49 is fitted on one end of the pivot shaft 48 and is clamped with a nut 50, then a worm 51 is brought into mesh with the worm gear 49, and a shaft 52 of the worm 51 is connected to a shaft 54 of a reduction motor 53 through a coupling 55. In these figures, the numeral 56 denotes a spring which is fixed to the partition plate 47 at one end 56*a* thereof and locked to the floor at the other end 56*b*.

In this embodiment, when a switch of the motor 53 is turned ON, the pivot shaft 48 is rotated via shaft 54, coupling 55, shaft 52, worm 51 and worm gear 49, so that the partition plate 47 can be raised as indicated with arrow 57. In this case, the raised angle of the partition plate 47 is not limited to 90°, but a desired angle may be selected, namely an angle below or above 90°. Further, by change-over of a switch in a motor circuit, the rotation of the motor reverses, whereby the partition plate 47 can be returned to its initial position.

Next, when the nut 50 is loosened, the pivot shaft 48 and the worm gear 49 become free, so that the partition plate 47 can be brought down as indicated with arrow 58 in FIG. 15 by virtue of the spring 56. When the nut 50 is tightened, the worm gear 49 is fixed to the shaft 48 by both collar 59 of the shaft 48 and nut 50.

In the embodiment illustrated in FIGS. 15, 16 and 17, the partition plate 47 can be raised and brought down automatically and can also be urged toward the floor by means of the spring 56.

Embodiment 6

Figure 18:
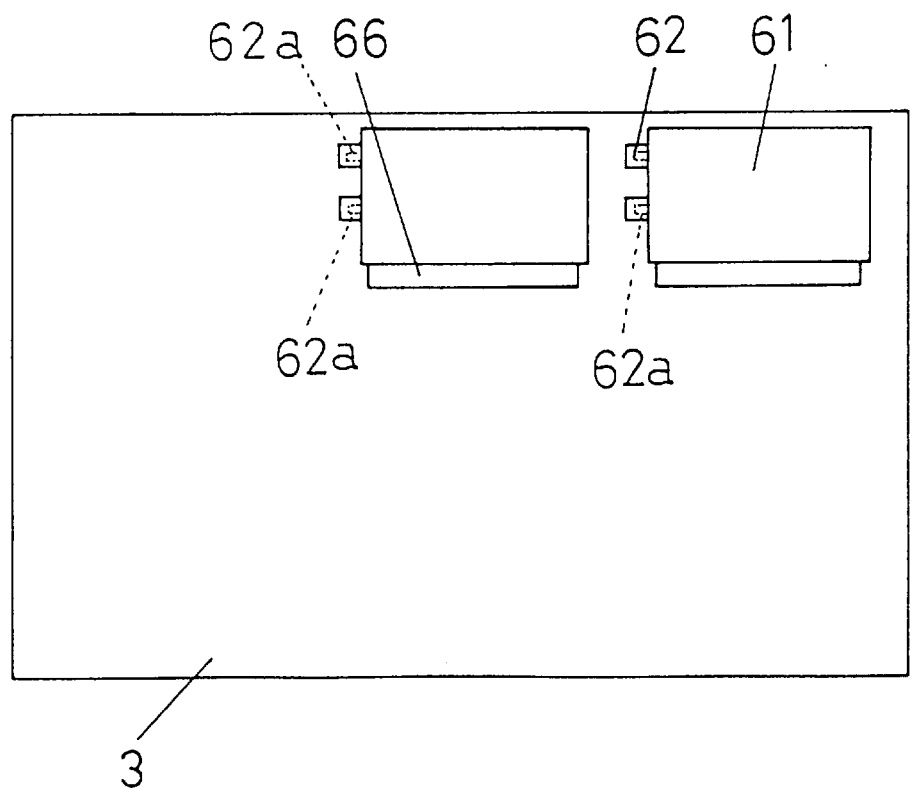
FIG. 18 is a plan view of a partition device according to the sixth embodiment of the present invention.

A further embodiment of the present invention will be described below with reference to FIGS. 18 and 19.

Rectangular partition cases 61 each having an opening 60 on one side are arranged at predetermined intervals on a floor 3 of a vehicular trunk and their lower portions are secured to the floor 3 with hinges 62. Coiled springs 62*a* and 62*b* are fitted on the shafts of the hinges 62 to urge the rectangular partition cases 61 toward the floor 3 as indicated with arrow 75 in FIG. 19. As to in what manner the coiled springs are fitted on the hinges 62, explanation is here omitted because it is the same as in the first embodiment illustrated in FIGS. 4 and 5.

Figure 19:
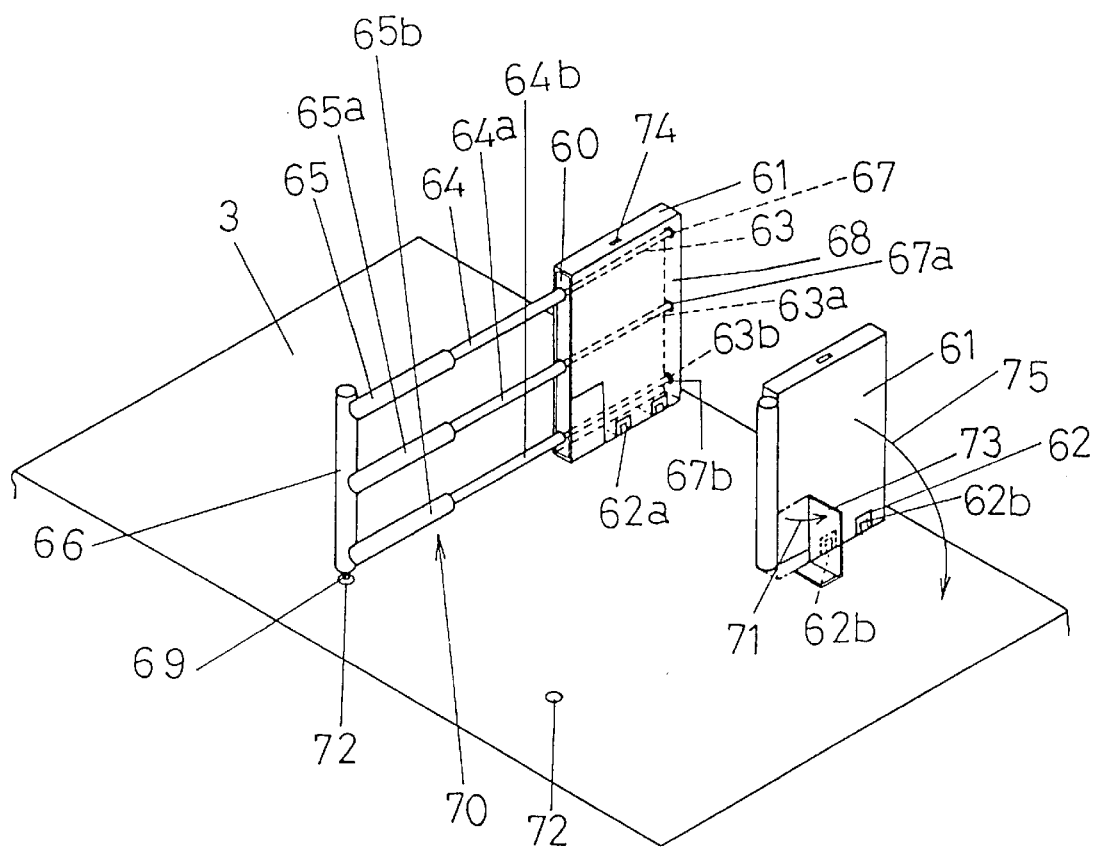
FIG. 19 is a perspective view showing in what state the partition device of FIG. 18 is used.

Within each of the rectangular partition cases 61, one end portions 67, 67*a* and 67*b* of partitioning frame rods 63, 63*a* and 63*b* are attached perpendicularly to an inner wall 68 located on the side opposite to the opening 60, as shown in FIG. 19. Onto the other end portions of the frame rods 63, 63*a* and 63*b* are fitted frame rods 64, 64*a*, 64*b* and 65, 65*a*, 65*b* successively in a telescopic fashion. The frame rods 65, 65*a* and 65*b* are connected together on their front end side through a connecting rod 66. A locking lug 69 is projected from the underside of the connecting rod 66 in a vertically movable manner (FIG. 19). As to the structure of the locking lug 69, explanation is here omitted because it is the same as the structure of the locking lug 21 used in the second embodiment (FIGS. 7 and 8).

The frame rods 63, 63*a*, 63*b*, frame rods 64, 64*a*, 64*b*, frame rods 65, 65*a*, 65*b*, and connecting rod 66, are generically termed a partitioner 70 (FIG. 19). It follows that the partition device for partitioning the interior of the trunk is composed of the rectangular partition cases 61 and the partitioner 70.

The partitioner 70 can extend and retract because the frame rods 63, 64 and 65 are connected together in a telescopic fashion. It can be stowed in each rectangular partition case 61, as shown on the right-hand side in FIG. 19.

The connecting rod 66 acts as both a cover for closing the opening of each partition case 61 and a handle for drawing out the partitioner 70.

On the other hand, a locking tube 72 for locking the locking lug 69 is fixed to the floor 3 as in the second embodiment.

In FIG. 19, the portion indicated by the reference numeral 73 represents a support piece for supporting each rectangular partition case 61 nearly vertically. Like the support piece 11 used in the first embodiment, the support piece 73 is hinged pivotably to the right-hand side wall of the partition case 61 in FIG. 19. Though not shown, the fitted state of the support piece 73 is maintained using permanent magnets. In the state illustrated on the left side of FIG. 19, the locking lug 69 in the partition device is fitted and locked into the locking tube 72 disposed in the floor 3, so that the partition device can be kept vertical even without turning the support piece 73 perpendicularly. However, for obtaining a strong partition, it is preferred that the support piece 73 be turned perpendicularly to maintain the rectangular partition case 61 nearly vertical. On the other hand, in the state illustrated on the right-hand side in FIG. 19, since rectangular partition case 61 is urged as indicated with arrow 75, the partition case 61 cannot be kept nearly vertical unless the support piece 73 is turned at right angles.

In FIG. 19, the reference numeral 74 denotes a knob to be grasped for raising the partition case 61.

In using the partition device of this embodiment, each partition case 61 is raised while grasping the knob 74, and then the support piece 73 located on the lower side of the partition case 61 is turned at right angles, whereby the partition case 61 is held nearly vertical. Next, the partitioner 70 is drawn out and the locking lug 69 is fitted and fixed into the locking tube 72 fixed to the floor 3, whereby the interior of the vehicular trunk can be partitioned (FIG. 19).

Figure 20:
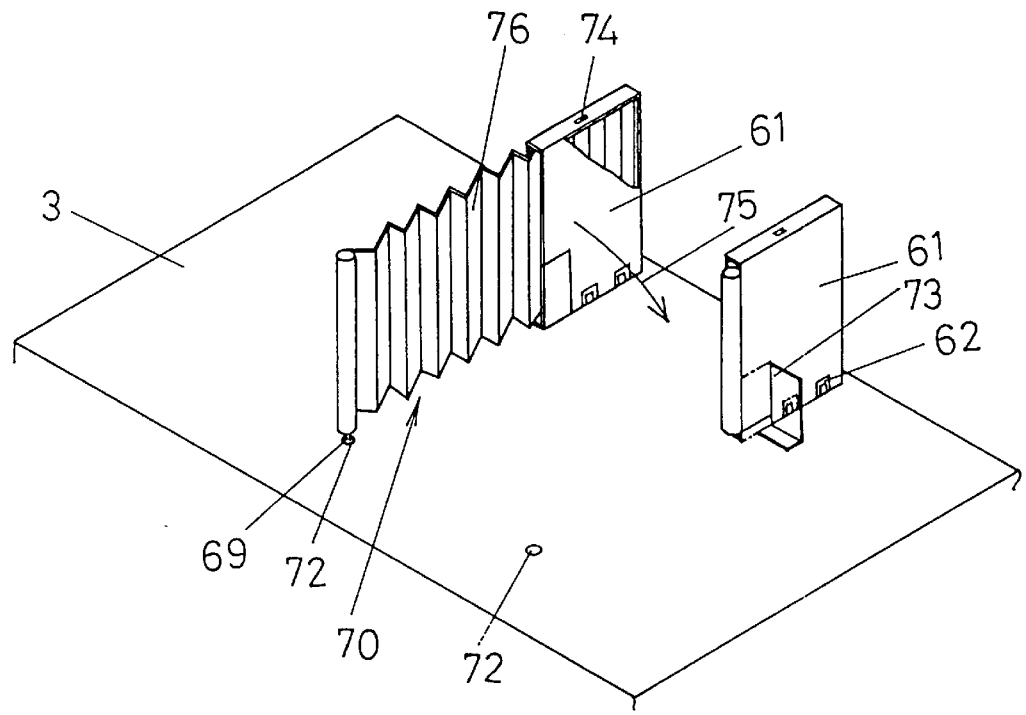
FIG. 20 is a perspective view showing in what state the partition device of FIG. 18 is used in an application example thereof.
Figure 21:
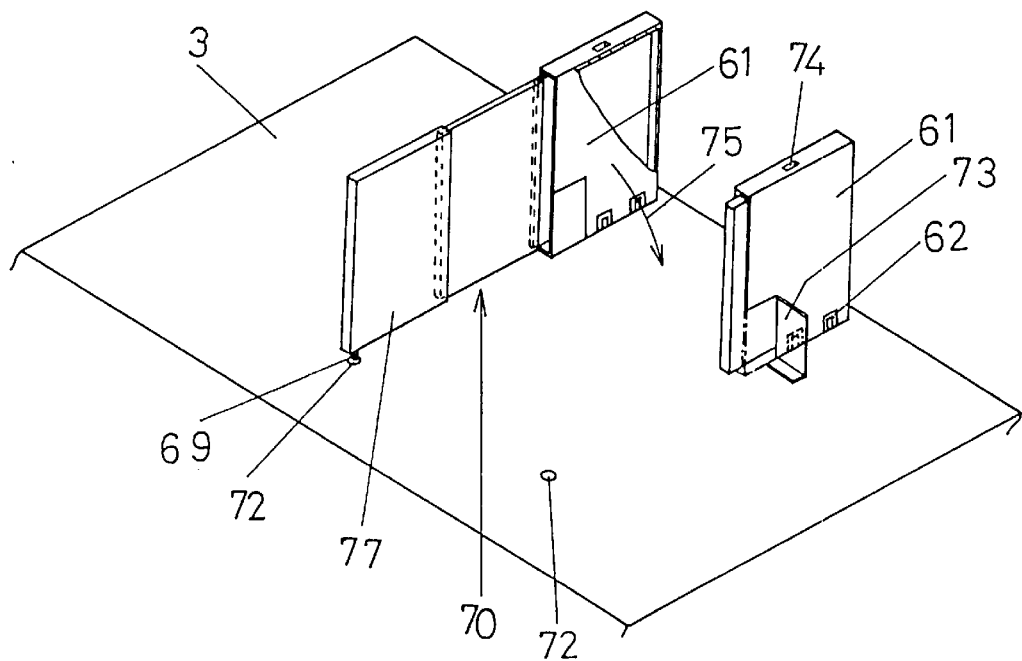
FIG. 21 is a perspective view showing in what state the partition device of FIG. 18 is used in another application example thereof.

Although the partitioner 70 is used as a frame rod in the above embodiment, it may be substituted by bellows 76 (FIG. 20) or a plate 77 capable of extension and retraction (FIG. 21).

Embodiment 7

Figure 22:
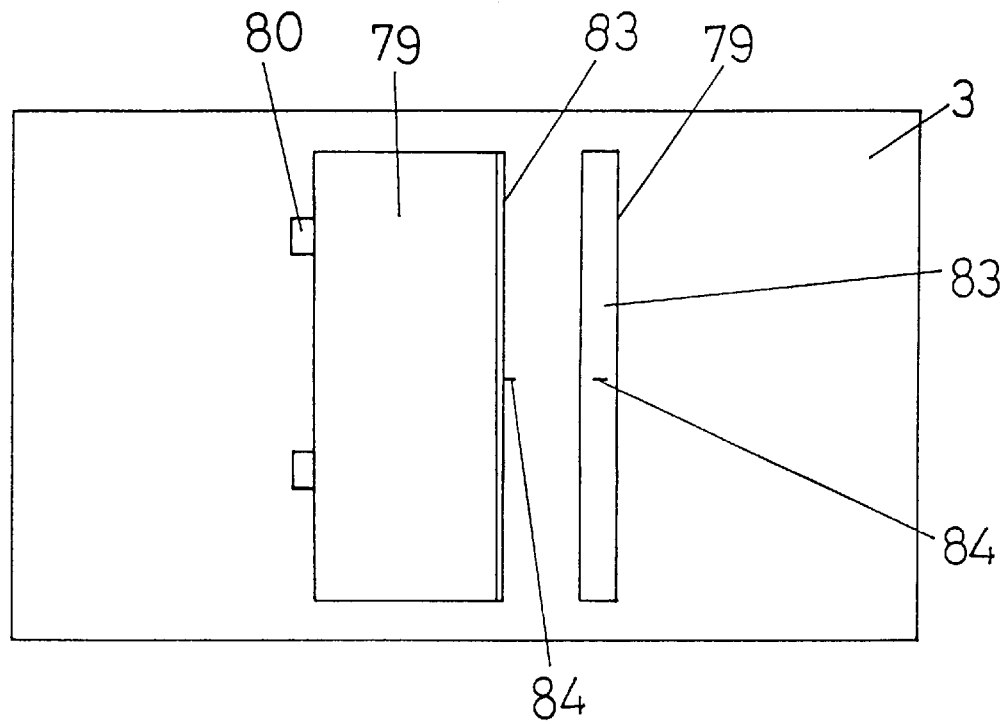
FIG. 22 is a plan view of a partition device according to the seventh embodiment of the present invention.

A still further embodiment of the present invention will be described below with reference to FIGS. 22 and 23.

Rectangular partition cases 79 each having an opening 78 on the upper end side are fixed on the lower end side to a vehicular floor 3 with hinges 80 at a predetermined spacing.

Figure 23:
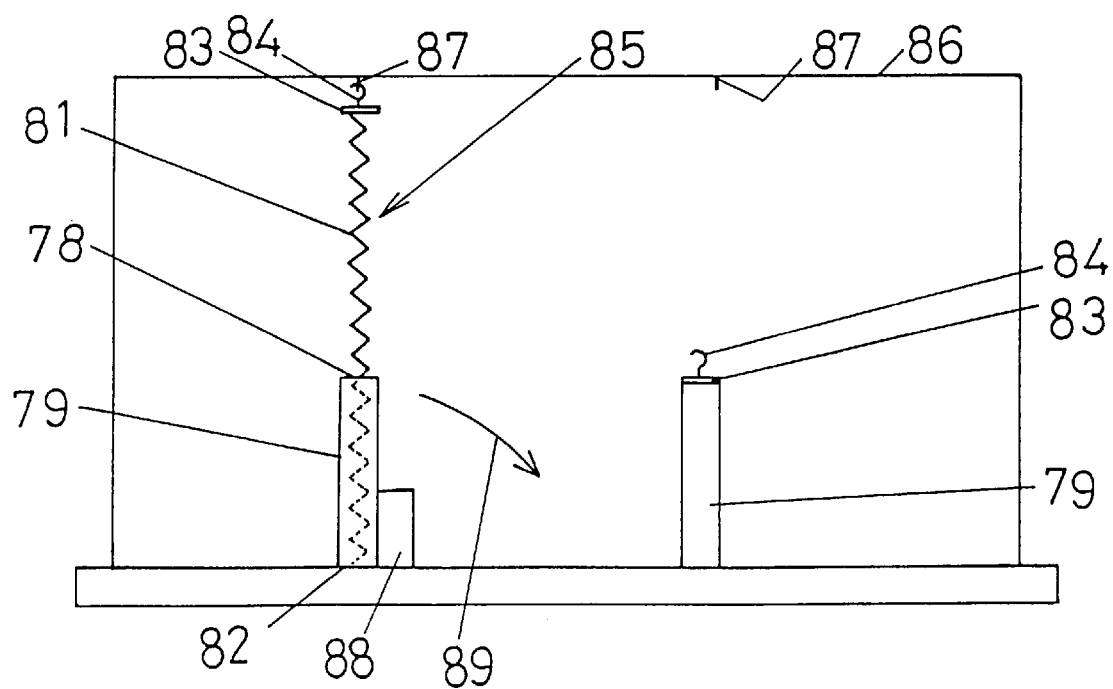
FIG. 23 is a side view showing in what state the partition device of FIG. 22 is used.

As in the first embodiment, coiled springs are fitted on the shafts of the hinges 80 to urge the partition cases 79 toward the floor 3, as indicated with arrow 89 (FIG. 23).

Bellows (partitioner) 81 is inserted into each rectangular partition case 79 and the base end thereof is fixed to a bottom 82 of the partition case 79. To the other end of the bellows 81 is attached a cover 83 for closing the opening 78, with a hook 84 being projected from the top of the cover 83. The hook 84 also acts as a knob for use in raising the partition case 79 or drawing out the partitioner 81.

On the other hand, a ring 87 for retaining the hook 84 is fixed to a ceiling 86 of the vehicular trunk.

In FIG. 23, the reference numeral 88 denotes a support piece for supporting the partition case 79 nearly vertically. Like the support piece 11 used in the first embodiment, the support piece 88 is hinged pivotably to the right-hand wall of the partition case 79 in FIG. 23. The fitted state of the support piece 88 is maintained using permanent magnets. In an engaged state of the hook 84 with the ring 87, it is not always necessary to turn the support piece 88 at right angles as on the left-hand side in FIG. 23. But in order for the bellows (partitioner) 81 to provide a stronger partition, it is preferable that the support piece 88 be turned at right angles as on the left-hand side in FIG. 23.

In using the partition device of this embodiment, each rectangular partition case 79 is raised while grasping the hook 84 and then the support piece 88 located on the lower side of the partition case 79 is turned at right angles, whereby the partition case 79 is raised nearly vertically. Next, the partitioner 81 is drawn out upward while grasping the hook 84, and the hook 84 is brought into engagement with the ring 87 fixed to the ceiling 86, whereby the interior of the vehicular trunk can be partitioned.

Embodiment 8

A still further embodiment of the present invention will be described below with reference to FIGS. 24, 25, 26, 27, 28, 29 and 30.

In the vicinity of both side walls 90 and 90*a* of a vehicular trunk, fitting means 93 and 93*a* are fixed opposedly to each other to a floor 3 with bolts 94. The fitting means 93 and 93*a* each comprise a support plate 92 and a polygonal rod 91 fixed vertically to the support plate 92.

One ends of partitioning frame rods 96, 96*a* and 96*b* are laterally connected to a base rod 95. The base rod 95 has a square hole 97 at its lower end portion for insertion therein of the polygonal rod 91 of one fitting means. Onto the other ends of the frame rods 96, 96*a* and 96*b* are fitted frame rods 98, 98*a*, 98*b* and frame rods 99, 99*a*, 99*b* successively in a telescopic fashion. The frame rods 99, 99*a* and 99*b* are connected on their front end side to a connecting rod 100. The connecting rod 100 has a square hole 97*a* formed in its lower end portion for fitting therein of the polygonal rod 91 of the other fitting means. These components are generically termed a partitioner (partition member) 101 (FIG. 24).

Figure 24:
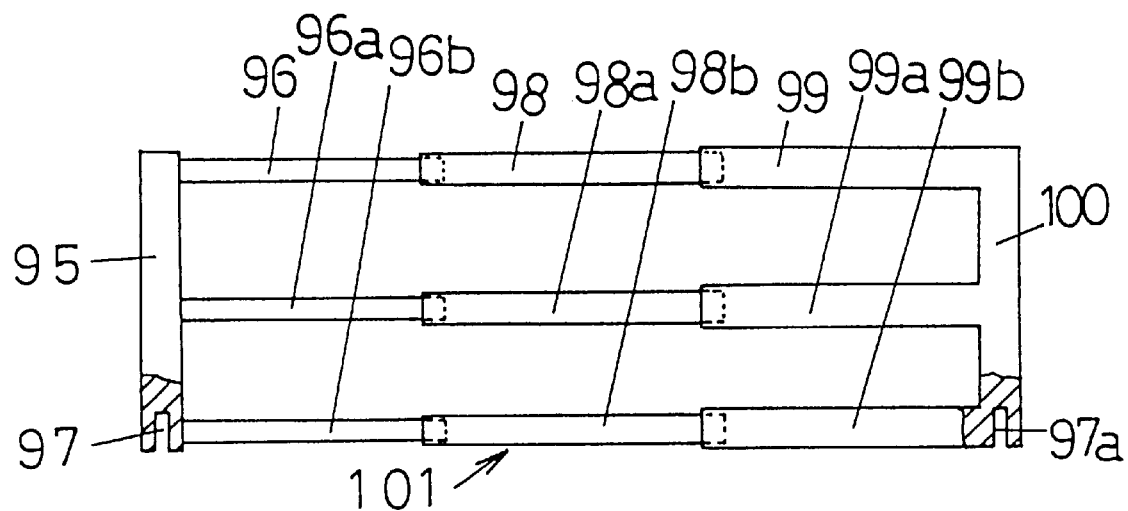
FIG. 24 is a partially omitted, partially sectional, front view showing in what state a partition device according to the eighth embodiment of the present invention is used.
Figure 25:
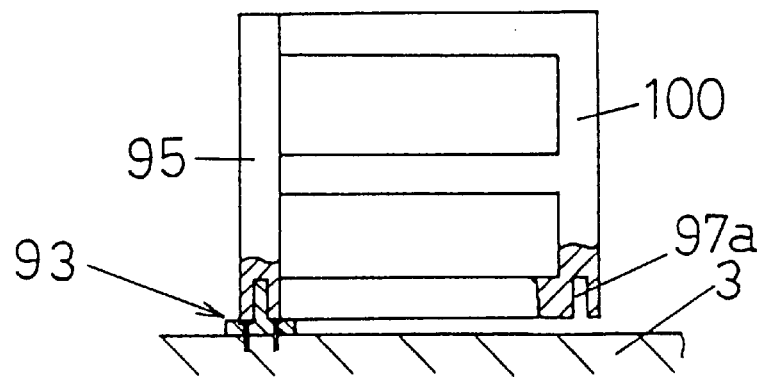
FIG. 25 is a partially sectional front view showing the partition device of FIG. 24 with frame rods in a retracted state.
Figure 26:
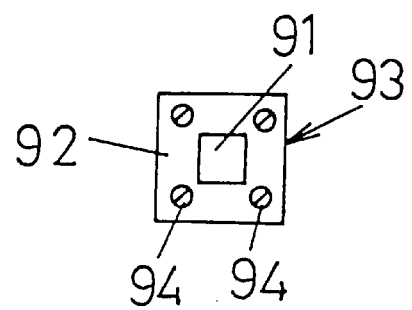
FIG. 26 is an enlarged plan view of fitting means used in the partition device of FIG. 24.
Figure 27:
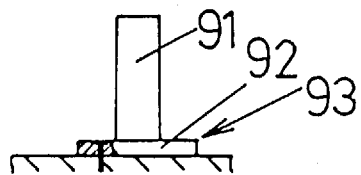
FIG. 27 is a partially broken-away front view of the fitting means shown in FIG. 26.

The frame rods 96, 98, 99 and the other frame rods of the partitioner 101 are pulled out into the state shown in FIG. 24, and the hole 97 of the base rod 95 is fitted on the polygonal rod 91 of the fitting means 93, while the hole 97 of the connecting rod 100 is fitted on the polygonal rod 91 of the other fitting means 93*a*. In this way there is constituted the vehicular trunk partitioning device of this embodiment.

As the polygonal rod 91 there may be used any rod if only the rod has a polygonal section such as, for example, a triangular, square or pentagonal section.

Figure 28:
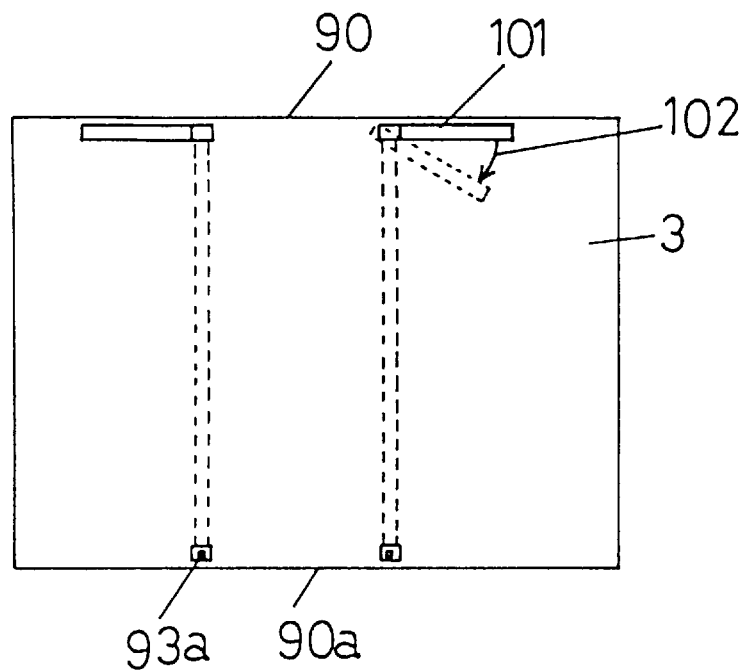
FIG. 28 is a plan view of the partition device shown in FIG. 24 which is not in use.

When the partitioner 101 is not in use, it is removed from the fitting means 93 and 93*a* in a state such that the frame rods 98, 98*a* and 98*b* are fitted into the frame rods 99, 99*a* and 99*b*, and the frame rods 96, 96*a* and 96*b* are fitted into the frame rods 98, 98*a* and 98*b*. Then, the partitioner 101 is locked by the fitting means 93 so as to be parallel to the side wall 90 of the trunk, as shown in FIG. 28. Since the partitioner 101 is fitted on the polygonal rod 91 of the fitting means 93, it does not rotate like arrow 102.

Figure 29:
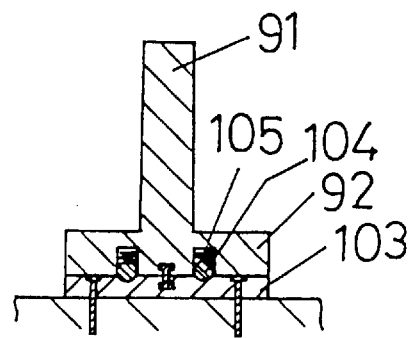
FIG. 29 is an enlarged sectional view of fitting means used in an application example of the partition device shown in FIG. 24.

Although in this embodiment the partitioner 101 cannot be rotated, it is possible to rotate the partitioner 101 if there is used a fitting means of such a construction as shown in FIG. 29. In the same figure, a support plate 92 with a polygonal rod 91 fixed upright thereto is placed on a lower plate 103, and steels balls 104 are disposed between the lower plate 103 and the support plate 92 and are pressed against the lower plate 103 by means of springs 105. In this case, the partitioner 101 can be held on the floor 3 in parallel with and in the vicinity of the side wall 90 of the trunk without the need of removing it from the fitting means 93 because the partitioner 101 can be rotated. It is also possible to turn the partitioner 101 at an angle of 90° and retain it at right angles to the side wall 90.

Figure 30:
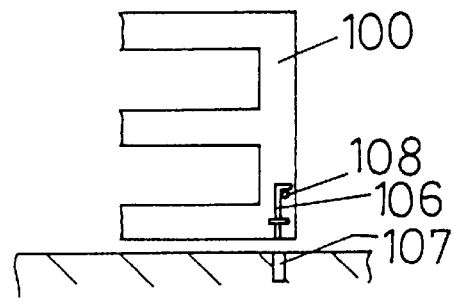
FIG. 30 is a front view showing a relation between a frame rod and a locking rod in an application example of the partition device shown in FIG. 24.

Although in this embodiment the lower end portion of the connecting rod 100 is locked by the fitting means 93*a*, a locking stem 106 may be attached to the lower end of the connecting rod 100 in a vertically movable manner and may be fitted in a locking hole 107 formed in the floor 3. In FIG. 30, the numeral 108 denotes a pin for retaining the locking stem 106. In this construction, the connecting rod 100 can be unlocked by raising the locking stem 106, and thus the mounting and removal of the partitioner 101 can be done easily.

Embodiment 9

A still further embodiment of the present invention will be described below with reference to FIGS. 31, 32, 33, 34, 35 and 36.

Rails 110 and 110*a* of a channel-like section for moving fitting means 109 and 109*a* are laid on the floor 3 in parallel with each other and in the vicinity of both side walls 90 and 90*a* of a vehicular trunk. The fitting means 109 and 109*a* are mounted movably to the rails 110 and 110*a*, respectively. The fitting means 109 and 109*a* each comprise a support plate 111, a polygonal rod 112 fixed at right angles to the upper surface of the support plate 111, and a locking portion 113 for slide through the interior of the rail 110 (110*a*), the locking portion 113 being formed on the lower side of the support plate 111.

Figure 31:
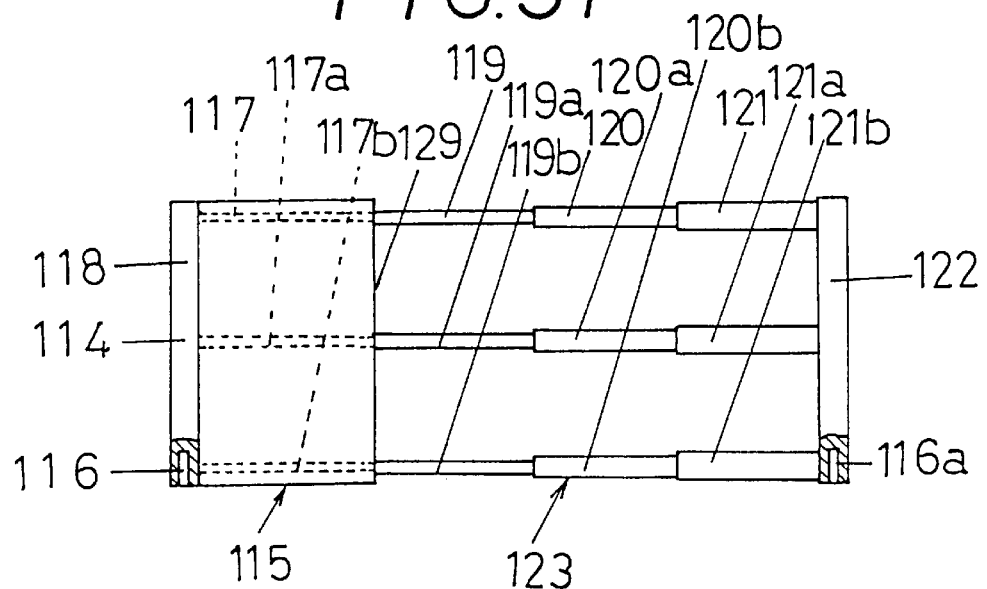
FIG. 31 is a partially omitted, partially sectional, front view showing in what state a partition device according to the ninth embodiment of the present invention is used.

A base rod 114 has a square hole 116 formed in its lower end for fitting therein of the polygonal rod 112, and a rectangular partition case 115 whose side face 129 opposed to the base rod 114 is open is disposed adjacent the base rod 114. Inside the partition case 115, one ends of frame rods 117, 117*a* and 117*b* are attached to an inner wall 118 of the partition case 115, as shown in FIG. 31. Onto the other ends of the frame rods 117, 117*a* and 117*b* are fitted frame rods 119, 119*a*, 119*b*, frame rods 120, 120*a*, 120*b* and frame rods 121, 121*a*, 121*b* successively in a telescopic fashion. The frame rods 121, 121*a* and 121*b* are connected at their front end side to a connecting rod 122. In the lower end portion of the connecting rod 122 is formed a square hole 116*a* for fitting therein of the polygonal rod 112. In this way there is formed a partition member (a partitioner comprising the partition case and the frame rods) which is indicated by the reference numeral 123 in FIG. 31.

Figure 33:
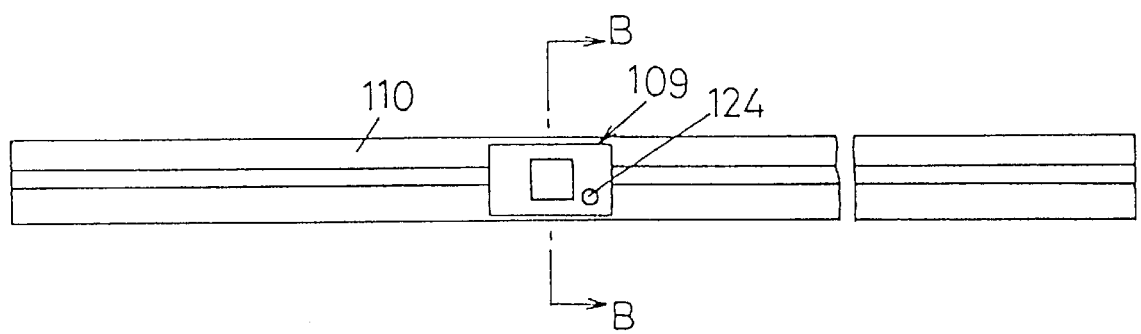
FIG. 33 is an enlarged plan view showing fitting means mounted on rails in the partition device of FIG. 31.
Figure 34:
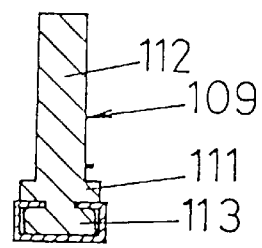
FIG. 34 is a sectional view taken on line B—B in FIG. 33.
Figure 35:
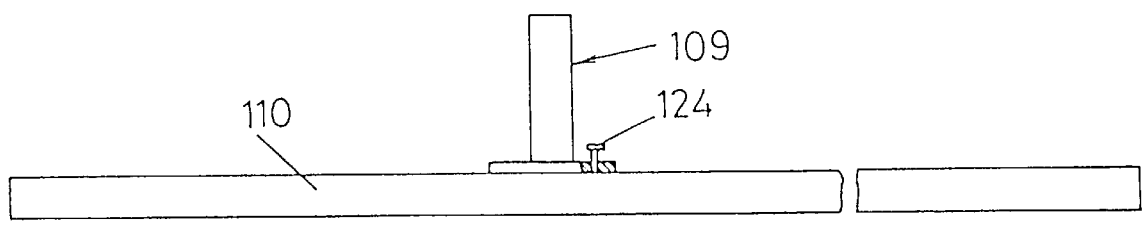
FIG. 35 is an enlarged side view showing fitting means mounted on rails in the partition device of FIG. 31.

Both end portions (the base rod 114 and the connecting rod 122) of the partition member 123 are brought into engagement with the fitting means 109 and 109*a* on the rails 110 and 110a to constitute a vehicular trunk partitioning device. In FIGS. 33 and 35, the reference numeral 124 denotes a bolt for fixing the fitting means 109 and 109a to the rails 110 and 110a. Loosening the bolts 124 permits the partition member 123 to move laterally on the rails 110 and 110a, and thus it is possible to freely change the spacing between plural partition members 123.

When the partition member 123 is not in use, it is removed from the fitting means 109 and 109a and is then retained by the fitting means 109a in parallel with the wall 90 for example. In this case, the frame rods 117, 119, 120, 121 and the other frame rods are received in a contracted state into the rectangular partition case 115, and the connecting rod 122 acts as a cover for the opening 129.

Figure 32:
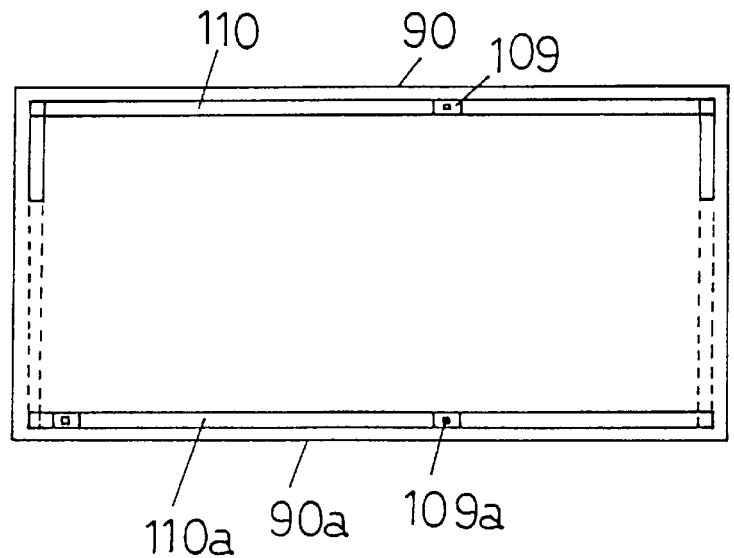
FIG. 32 is a plan view showing the partition device of FIG. 31 which is not in use.

Since the partition member 123 is movable on the rails 110 and 110a, the partition member 123 may be moved and held in the vicinity of the front or rear wall of the trunk while allowing both end portions (base rod 114 and connecting rod 122) of the partition member 123 to be retained by the fitting means 109 and 109a, as indicated with chain line in FIG. 32. In this case, the partition member 123 can be held near the front or rear wall of the trunk in an accommodated state of the frame rods within the partition case 115, as indicated with solid line in FIG. 32.

Further, since the partition member 123 is removable, several partition members 123 may be superimposed together and then fixed to a side wall of the trunk by means of a rubber belt or the like.

Figure 36:
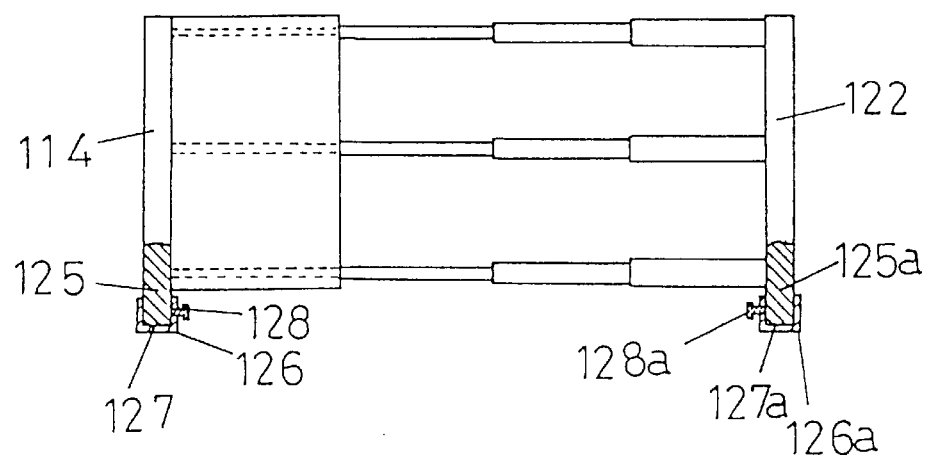
FIG. 36 is a partially sectional front view showing a relation between a partitioner and rails in an application example of the partition device shown in FIG. 31.

Although in this embodiment the partition member 123 is retained by the fitting means 109 and 109a, protrusions 125 and 125a may be formed on the lower ends of the base rod 114 and the connecting rod 122, respectively, of the partition member 123 and may be directly fitted removably in recesses 127 and 127a of rails 126 and 126a, as shown in FIG. 36. In the same figure, the reference numerals 128 and 128a denote bolts for preventing the movement of the partition member 123. Further, although in this embodiment the partition member 123 is moved manually, it may be moved electrically.

Although the present invention has been described with reference to the particular preferred embodiments, it should be understood that various changes and modifications may be made within the spirit and scope of the invention as defined in the appended claims.

What is claimed is:

1. A partition device for partitioning a vehicular trunk, said partition device comprising:

a support plate which is attachable to a first wall of the vehicular trunk;

a plurality of fitting balls projecting from said support plate;

a plurality of first partitioning frame rods pivotally mounted on said fitting balls, respectively; and a plurality of second partitioning frame rods slidably connected in a telescoping manner to said first partitioning frame rods, respectively;

wherein said first and second partitioning rods are movable relative to said support plate between a contracted non-use position and an extended use position.

2. A partition device as claimed in claim 1, further comprising:

a plurality of third partitioning frame rods slidably connected in a telescoping manner to said second partitioning frame rods, respectively; and a connecting rod connected to an outer end of each of said third partitioning frame rods.

3. A partition device as claimed in claim 2, further comprising a magnet secured to an outer peripheral surface of at least one of said third partitioning frame rods for holding said first, second and third partitioning frame rods in the contracted non-use position along the first trunk wall.

4. A partition device as claimed in claim 2, further comprising a locking lug fixed to said connecting rod, said locking lug being receivable in a recess formed in a second wall of the trunk so as to lock said first, second and third partitioning frame rods in the extended use position.

5. A partition device as claimed in claim 4, further comprising a magnet secured to an outer peripheral surface of one of said third partitioning frame rods for holding said first, second and third partitioning frame rods in the contracted non-use position along the first trunk wall.

* * * * *

UNITED STATES PATENT AND TRADEMARK OFFICE
CERTIFICATE OF CORRECTION

PATENT NO.    : 5,961,171

DATED         : October 5, 1999

INVENTOR(S)   : Shunichi Iijima

It is certified that error appears in the above-identified patent and that said Letters Patent is hereby corrected as shown below:

Column 3, line 41, change "A-A" to --V-V--.

Signed and Sealed this

Seventh Day of November, 2000

*Attest:*

Q. TODD DICKINSON

*Attesting Officer*   *Director of Patents and Trademarks*